(12) United States Patent
Madara et al.

(10) Patent No.: US 11,287,389 B2
(45) Date of Patent: Mar. 29, 2022

(54) APPARATUS AND METHODS OF ALIGNING, INSPECTING AND MANUFACTURING CERAMIC HONEYCOMB BODIES

(71) Applicant: Corning Incorporated, Corning, NY (US)

(72) Inventors: Russell Wayne Madara, Corning, NY (US); Eric Daniel Treacy, Beaver Dams, NY (US); Cynthia Leigh Wida, Lodi, NY (US); Xiaotian Zou, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 536 days.

(21) Appl. No.: 16/321,684

(22) PCT Filed: Jul. 21, 2017

(86) PCT No.: PCT/US2017/043250
§ 371 (c)(1),
(2) Date: Jan. 29, 2019

(87) PCT Pub. No.: WO2018/022445
PCT Pub. Date: Feb. 1, 2018

(65) Prior Publication Data
US 2021/0285894 A1    Sep. 16, 2021

Related U.S. Application Data

(60) Provisional application No. 62/368,726, filed on Jul. 29, 2016.

(51) Int. Cl.
*G01N 21/956* (2006.01)
(52) U.S. Cl.
CPC .............................. *G01N 21/95692* (2013.01)

(58) Field of Classification Search
CPC .......... G01N 21/954; G01N 21/95692; G01N 21/8806; G01N 21/9515; B01D 46/0086;
(Continued)

(56) References Cited

U.S. PATENT DOCUMENTS 3,826,923 A    7/1974 Trimble et al.
4,319,840 A    3/1982 Kondo et al.
(Continued)

FOREIGN PATENT DOCUMENTS

CN    1292497 A    4/2001
CN    102639990 A    8/2012
(Continued)

OTHER PUBLICATIONS

International Search Report of the International Searching Authority; PCT/US2017/043250 dated Nov. 3, 2017; 13 Pages; European Patent Office.
(Continued)

*Primary Examiner* — Sang H Nguyen
(74) *Attorney, Agent, or Firm* — Kurt R. Denniston

(57) ABSTRACT

An apparatus and method to align ceramic honeycomb bodies. The apparatus includes a light source to direct light toward a first end of a ceramic honeycomb body, a lens to receive at least a portion of the light directed to the first end of the ceramic honeycomb body, an imaging device to capture an image of the received light, wherein the image comprises a portion of a side surface of the honeycomb body. The apparatus comprises a controller configured to receive the captured image, to analyze the captured image based on the portion of the side surface, to adjust the ceramic honeycomb body and/or the lens based on the analysis to align the ceramic honeycomb body and the lens optical axis.

19 Claims, 8 Drawing Sheets

(58) Field of Classification Search
CPC .............. B01D 46/2418; G06T 7/0057; G01B 11/2531
See application file for complete search history.

(56) References Cited

U.S. PATENT DOCUMENTS

| | | | |
|---|---|---|---|
| 7,366,340 B1 | 4/2008 | Smithgall | |
| 7,701,570 B2 | 4/2010 | Gargano et al. | |
| 8,049,878 B2 | 11/2011 | Zoeller, III | |
| 8,285,027 B2 | 10/2012 | Zoeller, III | |
| 8,421,860 B2 | 4/2013 | Akao et al. | |
| 9,012,850 B2 | 4/2015 | Forster | |
| 10,145,805 B2 | 12/2018 | Stanford et al. | |
| 2001/0018153 A1 | 8/2001 | Irie | |
| 2003/0174320 A1 | 9/2003 | Yokoyama et al. | |
| 2007/0025498 A1 | 2/2007 | Matsuda | |
| 2007/0132988 A1* | 6/2007 | Gargano | B01D 46/2418 356/237.6 |
| 2010/0045975 A1* | 2/2010 | Zoeller, III | G01N 21/95692 356/239.2 |
| 2010/0238281 A1 | 9/2010 | Akao et al. | |
| 2010/0238284 A1* | 9/2010 | Akao | G01B 11/26 348/135 |
| 2011/0116704 A1* | 5/2011 | Zoeller, III | G01N 21/95692 382/141 |
| 2011/0128370 A1* | 6/2011 | Booth | G01N 21/95692 348/125 |
| 2015/0268174 A1* | 9/2015 | Citriniti | B01D 46/2418 356/237.2 |
| 2015/0346114 A1* | 12/2015 | Gregorski | G01N 21/95692 356/241.1 |
| 2017/0336332 A1* | 11/2017 | Stanford | G01N 21/95692 |

FOREIGN PATENT DOCUMENTS

| | | |
|---|---|---|
| CN | 105319225 A | 2/2016 |
| DE | 102007000477 A1 | 3/2008 |
| EP | 2813833 A1 | 12/2014 |
| JP | 02-205986 A | 8/1990 |
| JP | 08227035 A | 9/1996 |
| JP | 2003-270158 A | 9/2003 |
| JP | 2006-107870 A | 4/2006 |
| JP | 2008139052 A | 6/2008 |
| JP | 2009300455 A | 12/2009 |
| JP | 2010-249799 A | 11/2010 |
| JP | 2013140073 A | 7/2013 |
| WO | 2016085737 A1 | 6/2016 |

OTHER PUBLICATIONS

English Translation of JP2019504988 Office Action dated Aug. 26, 2020; 3 Pages; Japanese Patent Office.

Chinese Patent Application No. 201780058023.X, Office Action dated Dec. 17, 2020, 20 pages; Chinese Patent Office.

H.L.Chen et, al. Using colloidal lithography to fabricate and optimize sub-wavelength pyramidal and honeycomb structures in solar cells, optics express vol. 15, No. 22 pp. Oct. 25, 2007.

Japanese Patent Application No. 2019-504988, Decision to Grant dated Jul. 29, 2021, 5 pages (2 pages of English Translation and 3 pages of Original Document), Japanese Patent Office.

* cited by examiner

APPARATUS AND METHODS OF ALIGNING, INSPECTING AND MANUFACTURING CERAMIC HONEYCOMB BODIES

CROSS-REFERENCE TO RELATED APPLICATIONS

This application is a National Stage application under 35 U.S.C. § 371 of International Application No. PCT/US2017/043250, filed on Jul. 21, 2017, which claims the benefit of priority to U.S. Provisional Application No. 62/368,726, filed Jul. 29, 2016, the contents of which are incorporated herein by reference in their entireties.

FIELD

Exemplary embodiments of the present disclosure relate to apparatus and methods of manufacturing ceramic honeycomb bodies, more particularly, to apparatus and methods of automatically aligning ceramic honeycomb bodies in the manufacturing thereof.

DISCUSSION OF THE BACKGROUND

After-treatment of exhaust gas from internal combustion engines may use catalysts supported on high-surface area substrates and, in the case of diesel engines and some gasoline direct injection engines, a catalyzed filter for the removal of carbon soot particles. Porous ceramic flow-through honeycomb substrates and wall-flow honeycomb filters may be used in these applications.

The above information disclosed in this Background section is only for enhancement of understanding of the background of the disclosure and therefore it may contain information that does not form any part of the prior art nor what the prior art may suggest to a person of ordinary skill in the art.

SUMMARY

Exemplary embodiments of the present disclosure provide a method of inspecting ceramic honeycomb bodies automatically.

Exemplary embodiments of the present disclosure also provide a method of aligning ceramic honeycomb bodies automatically.

Exemplary embodiments of the present disclosure also provide an inspection apparatus to automatically inspect ceramic honeycomb bodies.

Exemplary embodiments of the present disclosure also provide an alignment apparatus to automatically align ceramic honeycomb bodies.

An exemplary embodiment discloses a method that comprises directing light toward a first end of a ceramic honeycomb body, wherein the ceramic honeycomb body comprises the first end, a second end opposite the first end, and a side surface extending from the first end to the second end. The method comprises blocking a portion of the directed light by a portion of the ceramic honeycomb body, imaging through a lens the second end as a first portion of the blocked light and a portion of the side surface as a second portion of the blocked light, capturing the image of the first portion of the blocked light and the second portion of the blocked light, analyzing at least a portion of the captured image, and adjusting at least one of the ceramic honeycomb body or the lens based on the analyzing to align the ceramic honeycomb body and an optical axis of the lens to each other.

Various embodiments of the method can be used (i) to automatically align a ceramic honeycomb body, (ii) to automatically inspect a ceramic honeycomb body, and/or (iii) in the manufacture a ceramic honeycomb body.

In some embodiments, the analyzing comprises detecting the second portion in the image.

In some embodiments, the analyzing comprises calculating the area of the second portion.

In some embodiments, the analyzing comprises determining the location of the second portion in relation to the first portion.

In some embodiments, the honeycomb body comprises cell channels extending from the first end to the second end and the adjusting aligns the cell channels to the optical axis of the lens.

In some embodiments, a first portion of the cell channels comprises plugs at the first end and a second portion of the cell channels comprises plugs at the second end.

In some embodiments, the method further comprises detecting the directed light through a portion of the first portion and/or second portion of the cell channels.

In some embodiments, the method further comprises identifying the detected light as transmitted through defective plugs.

In some embodiments, the method further comprises, when the defective plug is identified, recording at least one of an identifier of the ceramic honeycomb body or a location of the defective plug.

In some embodiments, the lens comprises a telecentric lens.

In some embodiments, directing light comprises directing at least one of diffuse light or collimated light.

An exemplary embodiment also discloses an apparatus that comprises a light source configured to direct light toward a first end of a ceramic honeycomb body wherein the ceramic honeycomb body comprises the first end, a second end opposite the first end, and a side surface extending from the first end to the second end. The apparatus comprises a lens configured to receive at least a portion of the light directed to the first end of the ceramic honeycomb body, an imaging device configured to capture an image of the received light, wherein the image comprises a portion of the side surface. The apparatus comprises a support chuck configured to support the ceramic honeycomb body; and a controller configured to receive the captured image, to analyze the captured image based on the portion of the side surface, to adjust at least one of the support chuck or the lens based on the analysis, and to align the ceramic honeycomb body and the lens optical axis.

The apparatus can be used to inspect a ceramic honeycomb body, align a ceramic honeycomb body, and/or manufacture a ceramic honeycomb body.

In some embodiments, the light source comprises at least one of a diffuse light source or a collimated light source.

In some embodiments, the lens comprises a telecentric lens.

In some embodiments, the controller is configured to detect the portion of the side surface in the image.

In some embodiments, the controller is configured to calculate an area of the portion of the side surface in the image.

In some embodiments, the controller is configured to calculate a location of the portion of the side surface in the image.

In some embodiments, the honeycomb body comprises cell channels extending from the first end to the second end and the controller is configured to align the cell channels to the optical axis of the lens.

In some embodiments, a first portion of the cell channels comprises plugs at the first end and a second portion of the cell channels comprises plugs at the second end, and the controller is configured to detect the light from the light source through a portion of at least one of the first portion or second portion of the cell channels.

In some embodiments, the controller is configured to identify the detected light as transmitted through defective plugs.

In some embodiments, when the defective plug is identified, the controller is configured to record at least one of an identifier of the ceramic honeycomb body or a location of the defective plug.

In some embodiments, the imaging device comprises a camera comprising a detector to capture the image of the received light.

In some embodiments, the apparatus further comprises a transport device configured to place the ceramic honeycomb body on the support chuck, wherein the channels and the lens optical axis are out of alignment with respect to at least one of a yaw angle or a pitch angle.

An exemplary embodiment also discloses a method that comprises disposing a ceramic honeycomb body in an initial position, wherein the ceramic honeycomb body comprises a first end and a second end opposite the first end; directing light toward the first end of a ceramic honeycomb body; capturing a plurality of images of the second end of the ceramic honeycomb body, wherein the capturing the plurality of images comprises: (i) capturing an image of the second end of the ceramic honeycomb body; (ii) rotating the ceramic honeycomb body to another position by a step amount; (iii) incrementing a counter; and (iv) repeating processes (i)-(iii) until the counter reaches a preset value; and analyzing the plurality of images to identify defects within the ceramic honeycomb body.

In some embodiments, the step amount is a positive step amount.

In some embodiments, capturing the plurality of images further comprises: (v) resetting the ceramic honeycomb body to the initial position; (vi) rotating the ceramic honeycomb body to another position by a negative step amount; (vii) capturing an image of the second end of the ceramic honeycomb body; (viii) incrementing a counter; (ix) repeating processes (vi)-(viii) until the counter reaches a second preset value.

In some embodiments, rotating the ceramic honeycomb body to another position comprises at least one of: rotating the ceramic honeycomb body around a yaw axis or rotating the ceramic honeycomb body around a pitch axis.

In some embodiments, rotating the ceramic honeycomb body to another position by the step amount comprises rotating the ceramic honeycomb body around a yaw axis.

In some embodiments, capturing the plurality of images further comprises: (v) resetting the ceramic honeycomb body to the initial position; (vi) rotating the ceramic honeycomb body around a pitch axis to another position by a second step amount; (vii) capturing an image of the second end of the ceramic honeycomb body; (viii) incrementing a counter; (ix) repeating processes (vi)-(viii) until the counter reaches a second preset value.

In some embodiments, analyzing the plurality of images to identify defects within the ceramic honeycomb body comprises identifying defective plugs within channels of the ceramic honeycomb body.

An exemplary embodiment also discloses an apparatus that comprises a light source configured to direct light toward a first end of a ceramic honeycomb body, wherein the ceramic honeycomb body comprises the first end and a second end opposite the first end; a lens configured to receive at least a portion of the light directed to the first end of the ceramic honeycomb body; an imaging device configured to capture images of the received light; a support chuck configured to support the ceramic honeycomb body and rotate the ceramic honeycomb body to different positions; and a controller configured to: (i) control the support chuck such that the support chuck rotates the ceramic honeycomb body to another position by a step amount; (ii) increment a counter; repeat processes (i) and (ii) until the counter reaches a preset value; receive a plurality of images of the received light captured at the plurality of different positions of the ceramic honeycomb body; and analyze the plurality of images to identify defects within the ceramic honeycomb body.

In some embodiments, the controller is configured to rotate the ceramic honeycomb body around at least one of: a yaw axis or a pitch axis.

In some embodiments, the controller is configured to rotate the ceramic honeycomb body around both a yaw axis and a pitch axis.

In some embodiments, the defects within the ceramic honeycomb body comprise defective plugs within channels of the ceramic honeycomb body.

Additional features of the disclosure will be set forth in the description which follows, and in part will be apparent from the description, or may be learned by practice of the disclosure.

It is to be understood that both the foregoing general description and the following detailed description are exemplary and explanatory and are intended to provide further explanation of the disclosure.

BRIEF DESCRIPTION OF THE FIGURES

The accompanying drawings, which are included to provide a further understanding of the disclosure and are incorporated in and constitute a part of this specification, illustrate exemplary embodiments of the disclosure, and together with the description serve to explain the principles of the disclosure.

DETAILED DESCRIPTION

Figure 1:
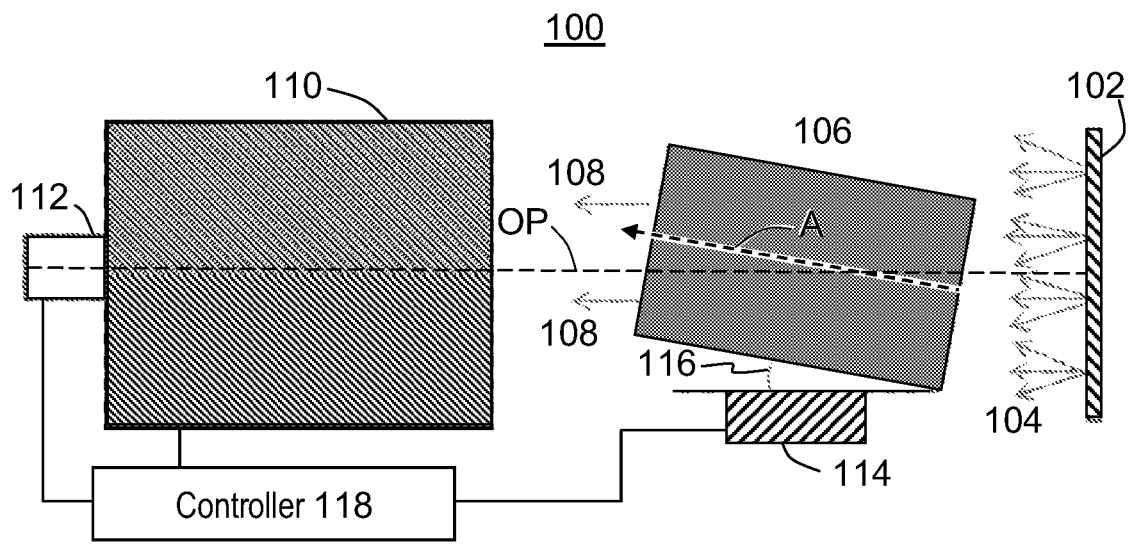
FIG. 1 presents a schematic side view of an inspection apparatus according to exemplary embodiments of the disclosure.

The manufacture of porous ceramic honeycomb bodies may be accomplished by the process of plasticizing ceramic powder batch mixtures, extruding the mixtures through honeycomb extrusion dies to form honeycomb extrudate, and cutting, drying, and firing the extrudate to produce ceramic honeycomb bodies of high strength and thermal durability having channels extending axially from a first end face to a second end face. As used herein a ceramic honeycomb body includes ceramic honeycomb monoliths and ceramic segmented honeycomb bodies.

A co-extruded or an after-applied exterior skin may form an outer axial peripheral surface of the ceramic honeycomb bodies. The outer axial peripheral surface is referred to herein as the side surface of the ceramic honeycomb body. Each channel of the honeycomb bodies, whether monolithic or segmented, can be plugged at an inlet face or an outlet face to produce a filter. When some channels are left unplugged a partial filter can be produced. The honeycomb body, whether monolithic or segmented, can be catalyzed to produce a substrate. Further, filters and partial filters can be catalyzed to provide multi-functionality. The ceramic honeycomb bodies thus produced are widely used as ceramic catalyst supports in motor vehicle exhaust systems, and as catalyst supports and wall-flow particulate filters for the removal of soot and other particulates from engine exhausts.

Among the commercially successful processes for ceramic honeycomb manufacture are those that utilize large co-rotating twin screw extruders for the mixing and extruding of ceramic honeycomb extrudate. Ram extrusion, pressing, casting, spraying and 3-dimensional printing are other processes for ceramic honeycomb manufacture.

Exemplary embodiments of the disclosure provide an apparatus to automatically inspect honeycomb bodies and a method of automatically inspecting ceramic honeycomb bodies. According to these exemplary embodiments, an apparatus and method are provided that automatically align the part with the optical axis of the inspection system to image the substrate for defects.

Work with automated light box systems has revealed that light box methods exhibit poor repeatability if the process lacks a repeatable alignment method. Experience using manual light box inspection as well as laboratory experimentation has demonstrated that the appearance of defects varies with small changes in the orientation of the part being inspected. Automatically finding the orientation in space of the parallel channels of the part in a way which is repeatable and accurate was found to provide repeatable images for repeatable image analysis and defect detection.

Filters can be checked for light leakers after plugging. As used herein, light leaker refers to a defective plug in a cell channel that transmits light during an inspection involving shining a light on one end of a plugged cell channel and checking for transmitted light through the plug. A method for checking for light leakers utilizing an automated system known as an automatic light box (ALB) is described in U.S. Pat. No. 8,049,878 B2, the entire contents of which are incorporated by reference as if fully set forth herein. In the ALB system, a part is supported with the part face down on a clear plastic surface. A light box in the ALB system directs light through the clear plastic towards the supported face of the part and then images any light which is emitted from the opposing face of the part. Any light which passes through the filter is a light leaker and is indicative of a missing, partial, damaged, or shallow plug. The ALB system detects the presence of light, but does not discern between other characteristics of the light leakers such as shape and grayscale distribution, which can be beneficial to measure.

When a light leaker is present, a resulting intensity of the imaged light leak is dependent on how well the channels of the filter are aligned with the lighting and imaging system of the ALB system. The accuracy and repeatability of the ALB system and method for inspection of filters for light leakers is reduced by any lack of perpendicularity between the supported face and channels of the part. Therefore, it is desirable to have a method for aligning the part with the inspection system in a repeatable manner in order to improve the repeatability and accuracy of the inspection.

International Application No. PCT/US2015/061471, filed Nov. 19, 2015, the entire contents of which are incorporated by reference as if fully set forth herein, describes a substrate inspection system of automatic alignment between a ceramic substrate and an imaging system. This substrate inspection system utilizes a search algorithm to find a position of maximum light transmitted through a substrate. However, such a method is not applicable to filters because the plugs prevent light from being transmitted unless a plug defect is present.

An opaque three-dimensional body such as a porous ceramic honeycomb body having axially extending and plugged channels (referred to herein as a part) can be automatically inspected according to exemplary embodiments of the disclosure. The methods and systems according to these exemplary embodiments can achieve improved repeatability and accuracy for light leaker inspection due to the alignment procedure, the use of a telecentric lens, and a uniform diffuse back light according to the disclosure. These methods and systems as described herein for alignment use only equipment which is required to perform the inspection, rather than using additional equipment for the alignment procedure. For example, displacement sensors can be used to measure the position of the part. However, displacement sensors add complexity and cost to the methods and systems.

These methods and systems according to exemplary embodiments of the disclosure do not require bladders or masks as described for the ALB system and in U.S. Pat. No. 4,319,840, respectively. The disclosed methods and systems are adapted to implementation as inline methods and systems on a production line because the part can be automatically aligned and inspected while it is on a fixture on an assembly line without manual intervention. In contrast, the ALB system may be difficult to implement in line due to the vertical orientation, use of bladders, and lack of automatic part alignment capability. The disclosed methods and systems are capable of accurately measuring shape and grayscale distribution of light leakers. In contrast, as mentioned above, the ALB system is limited in these capabilities. For example, the methods and systems disclosed herein are capable of detecting and assessing the severity of translucent plugs as described in more detail below.

According to exemplary embodiments of the disclosure, when a filter is approximately aligned with a backlight and telecentric lens system, an image is collected that shows the face of the filter as a dark image, such as a circle, ellipse, or other cross sectional shape of the end face, with a crescent shaped portion of the outer periphery (side surface), such as the skin, of the filter. The crescent shaped portion of side surface of the filter can be referred to herein as a shadow of a portion of the side surface. The size and location of the imaged portion of the skin is used to calculate the angular displacement necessary to align the filter to the imaging system. Thus, the filter is automatically brought into alignment and the inspection is automatically performed. After the alignment is completed, the telecentric lens allows measurement of light leakers.

FIG. 1 presents a schematic side view of an inspection apparatus 100 according to exemplary embodiments of the disclosure. As illustrated schematically in FIG. 1, a diffuse light source 102 provides light 104 toward a first face (for example, an inlet face) of the ceramic honeycomb body (part) 106. The diffuse light source 102 (light source) can be a light source transmitted through a diffuser or the diffuse light source 102 can optionally be a collimated light source 102. For example, the diffuse light source 102 can be a light box that has a light emitting surface area greater than an end surface area of the part 106, wherein the end surface area is a cross section through the part 106 that intersects the axial direction "A" of the part 106. Further, the diffuse light source 102 can be a light box that has a light emitting surface area greater than a projection in two dimensions of the tilted part 106 perpendicular to the light emitting surface as described further below. The diffuse light source 102 is referred to herein as a backlight. The light 108 that is transmitted through the channels of the part 106 is emitted from a second face (for example, an outlet face) of the part 106 toward a telecentric lens 110. The telecentric lens 110 can be a Fresnel lens 110 or other type of telecentric lens. The telecentric lens 110 (lens) images the light passing through the area (diameter) of the part. For example, if the part 106 has defective plugs, some light will pass through the defective plugs and emerge as light 108. For example, the lens 110 can image an area greater than an end surface area of the part 106, wherein the end surface area is a cross section through the part 106 that intersects the axial direction "A" of the part 106.

A camera 112 receiving the image from the lens 110 contains a detector that collects the image. A support chuck 114 provides a support for the part 106 at some angle 116 from alignment. The angle 116 may be the angle between the part 106 outer peripheral axial surface and a reference axis extending from the light source 102 to the camera 112, such as along an optical axis OP of the lens from the light source 102 to the camera 112. The angle 116 viewed from the side as in FIG. 1 may be referred to herein as the near alignment angle. The collected image may be transmitted from the camera 112 detector to a controller 118 and analyzed. The angle 116 causes a small portion of the skin to be visible in the resulting image.

Figure 2:
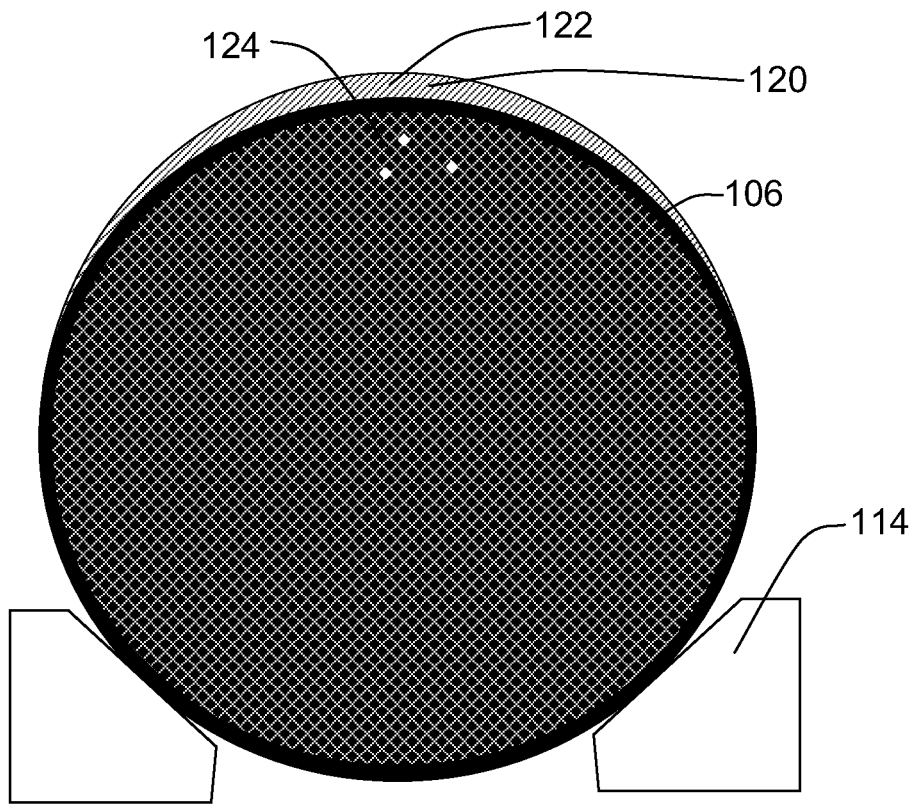
FIG. 2 shows an end view of a part in the support chuck of the inspection apparatus looking toward the diffuse light source according to exemplary embodiments of the disclosure.

FIG. 2 shows an end view of a part 106 in the support chuck 114 of the inspection apparatus 100 looking toward the diffuse light source 102 according to exemplary embodiments of the disclosure. A crescent shaped portion of the side surface 120 having a width 122 can be seen at the top edge of the part 106. Light leakers 124 are hardly detectable when the part 106 is not aligned with the optical axis OP of the inspection apparatus 100.

Figure 3:
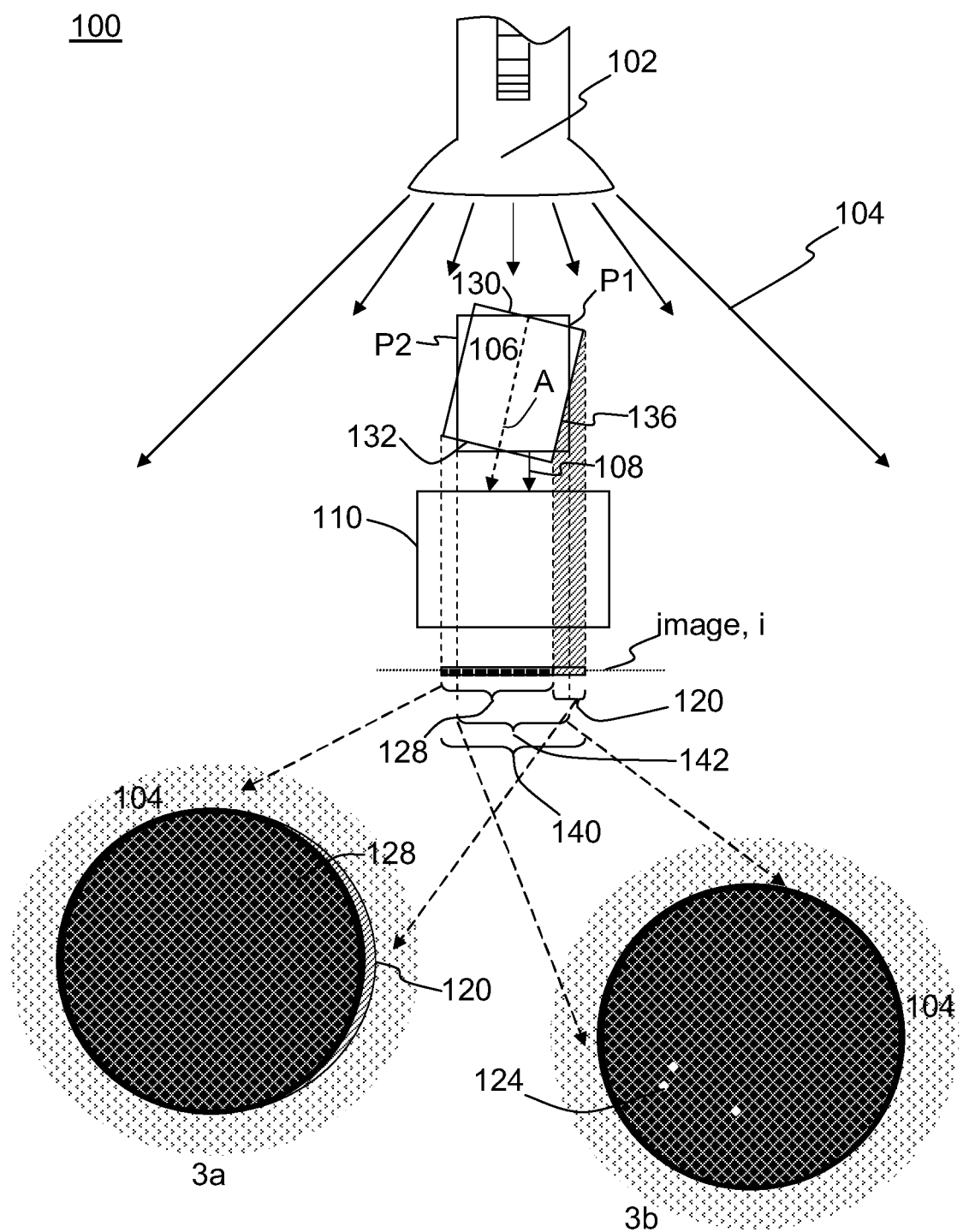
FIG. 3 illustrates a schematic side view of an inspection apparatus according to exemplary embodiments of the disclosure.

Referring to FIG. 3, the part 106 has a first end face 130 disposed toward the light source 102, a second end face 132 opposite the first end face 130, and a side surface (outer periphery) 136 extending axially from the first end face 130 to the second end face 132. The part 106 illustrated in a first position P1 is not aligned with the optical axis OP, for example, the axial direction A of the part channels is at an angle 116 to the optical axis OP and/or the axial direction of the part 106 side surface 136 is at an angle 116 to the optical axis OP. When the part 106 is not aligned with the optical axis OP, an image i (140) at the camera 112 shown in insert 3a has a first portion of blocked light 128 composed of the part 106 second end face 132 and a second portion of blocked light 120 composed of a portion of the side surface 136 of the part 106, and unblocked light 104.

The part 106 illustrated in a second position P2 shown in FIG. 3 is aligned with the optical axis OP, for example, the axial direction A of the part is aligned with the optical axis OP. When the part 106 is aligned with the optical axis OP, the total area of the blocked portion of light is minimized. When the part 106 is aligned with the optical axis OP, an image i (142) at the camera 112 shown in insert 3b shows little if any second portion 120, and unblocked light 104. In other words, when the part 106 is aligned with the optical axis OP within a predetermined level, the side surface 136 is hardly visible if at all in the image i (142) and the image i (142) will have a minimized second portion 120 composed of a portion of the side surface 136 of the part 106.

The part 106 can be adjusted to be aligned with the optical axis OP or the telecentric lens 110 can be adjusted to adjust the optical axis OP to the part 106. When the diffuse light source 102 (light source) is a collimated light source 102, adjusting the telecentric lens 110 involves adjusting the light source 102 as well.

Figure 4:
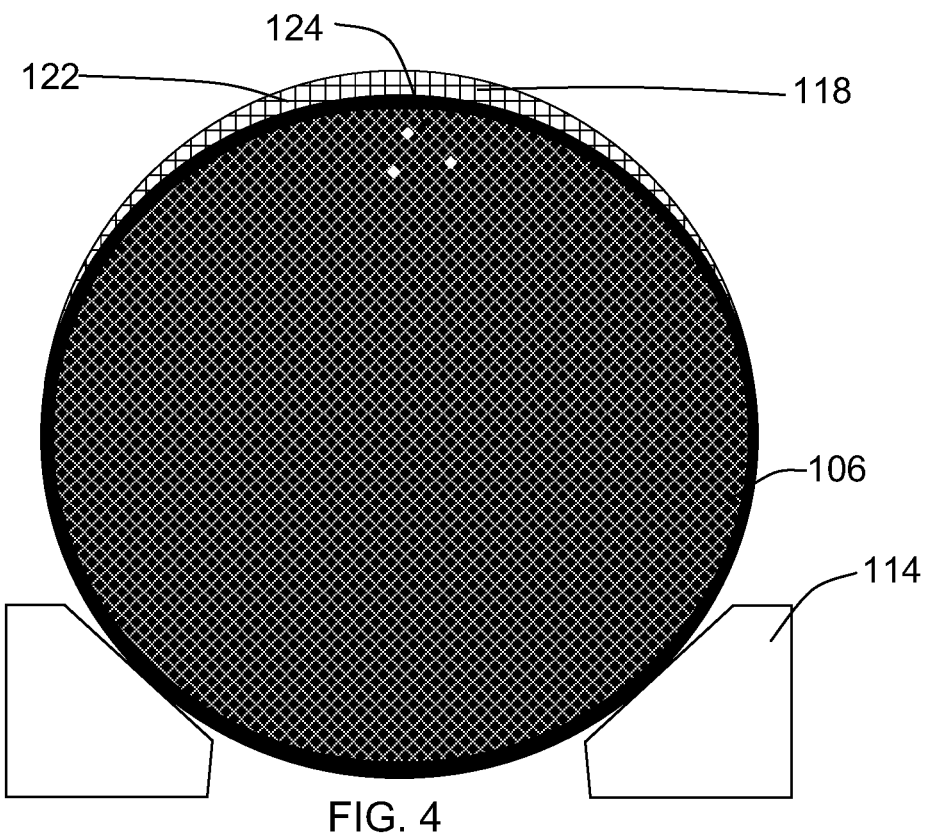
FIG. 4 shows an end view of the part in the support chuck of the inspection apparatus in FIG. 2 showing the location and width of the skin portion looking toward the diffuse light source according to exemplary embodiments of the disclosure.

FIG. 4 shows an end view of the part 106 in the support chuck 114 of the inspection apparatus 100 in FIG. 2 showing the location and width of the portion of the side surface 120 looking toward the diffuse light source 102 according to exemplary embodiments of the disclosure. Image processing software was written to find the skin portion 120 of the image, and calculate its location and width 122. The small portion 120 created by the skin of the part 106 can be extracted and measured with image processing software.

Figure 5:
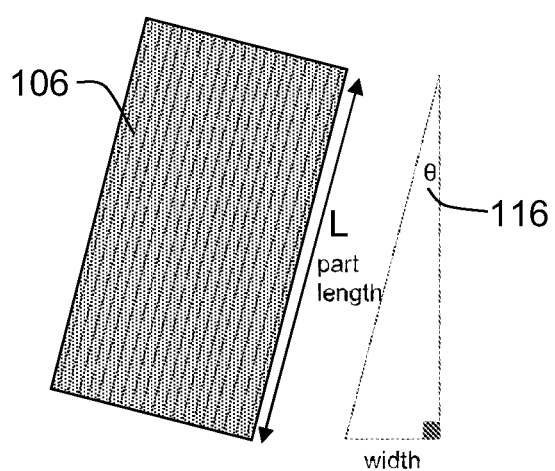
FIG. 5 is a schematic of a part angle θ relative to the optical axis of the imaging system according to exemplary embodiments of the disclosure.

FIG. 5 is a schematic of a part angle θ, 116 relative to the optical axis OP of the imaging system 100 according to exemplary embodiments of the disclosure. Using the width 122 of the portion of the side surface 120 measured, for example as described with reference to FIGS. 3 and 4, and a known part length L, the angle θ, 116 of the part 106 relative to the optical axis OP of the system is calculated.

Another exemplary embodiment of the disclosure provides an alignment method that uses the same apparatus shown in FIGS. 1-5, but does not use or require a skin shadow. This exemplary embodiment, illustrated in FIGS. 6-9, uses a cell aspect ratio method. The cell aspect ratio images the plugs and cells on the part face closest to the lens (the second end). Light may illuminate the second end so that the plugs and cells on the second end part face can be detectable and measureable. The image intensity can be increased to accomplish imaging the plugs and cells on the second end part face. This may be achieved without any hardware modifications by increasing camera gain or camera integration time. Areas which easily transmit light (outside of the part or a light leaker) will become over exposed, but areas which do not easily transmit light (plugged cells) will become bright enough to analyze.

Figure 6:
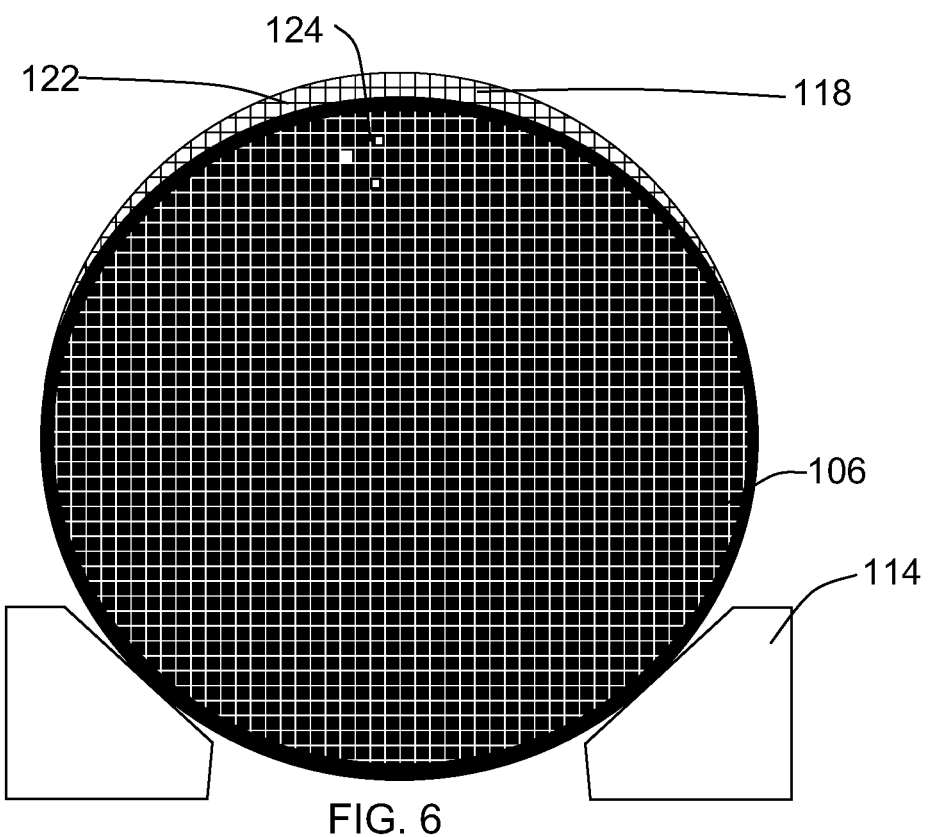
FIG. 6 is an end view of a tilted part second end.
Figure 7:
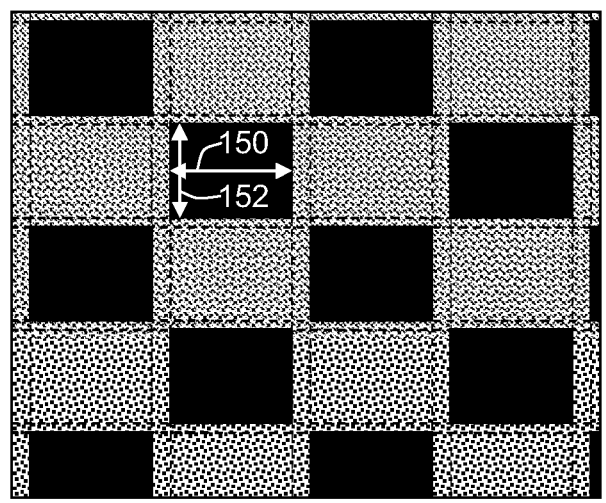
FIG. 7 is a zoomed in view of the second end in FIG. 6 where cell length and cell width are indicated and image aspect ratio is defined as length/width according to exemplary embodiments of the disclosure. The tilted part shows the cell aspect ratio greater than 1.

FIG. 6 is an end view of a tilted part second end. FIG. 7 is a zoomed in view of the second end in FIG. 6 where cell length 150 and cell width 152 are indicated and image aspect ratio is defined as length/width according to exemplary embodiments of the disclosure. The tilted part shows the cell aspect ratio greater than 1.

Once the image is captured, the aspect ratio of any number of the cells 156 and/or plugs 158 may be measured. If a vector normal to the face of the part is not parallel with the optical axis of the imaging system, the actual shape of the cell will not be imaged. Rather, the projection of the cell onto the image plane will determine the apparent shape of the cell, and the aspect ratio will be some value other than 1. The aspect ratio of many cells may be measured with sub pixel accuracy and then averaged together, in order to improve accuracy and robustness of the process. While square cells are shown, the disclosed method can be applied to other cell shapes such as hexagonal, triangular, etc.

Trigonometry and vector analysis can then be used to calculate the angle between the part face normal vector and the optical axis vector. The sine of the angle can be determined by an image intensity profile inside the cell. Like the skin alignment method, once this angle is known, the angle can be eliminated. The result is an improvement in the alignment of the face normal vector with the imaging.

Figure 8:
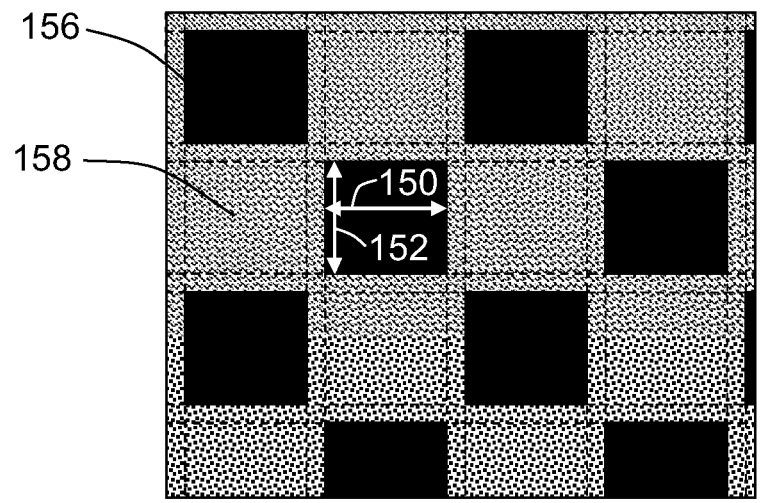
FIG. 8 is a schematic of the second end face of FIG. 7 when the part is aligned the aspect ratio is 1.
Figure 9:
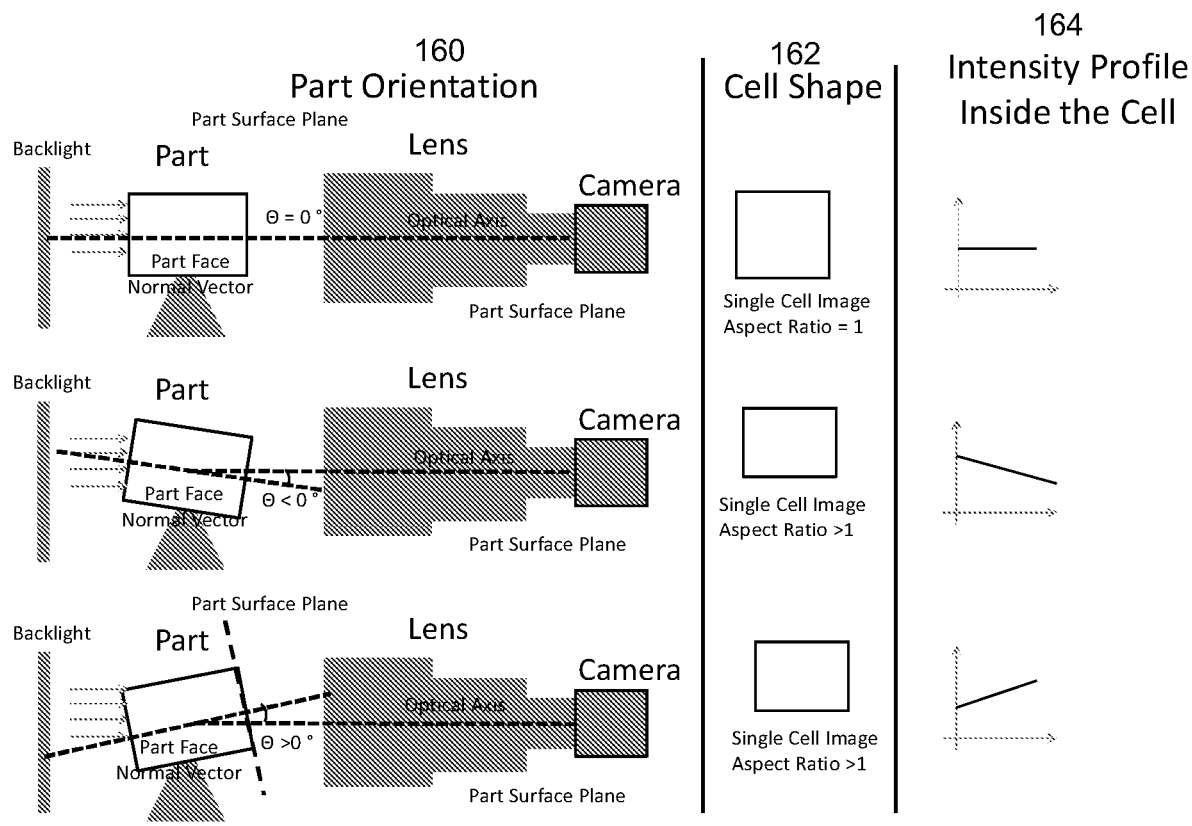
FIG. 9 is a schematic side view of an inspection apparatus, cell shape, and intensity profile inside the cell at alignment and positive and negative pitch angles according to exemplary embodiments of the disclosure.

FIG. 8 is a schematic of the second end face of FIG. 7 when the part is aligned the aspect ratio is 1. FIG. 9 is a schematic side view of an inspection apparatus, cell shape, and intensity profile inside the cell at alignment and positive and negative pitch angles according to exemplary embodiments of the disclosure.

Figure 10:
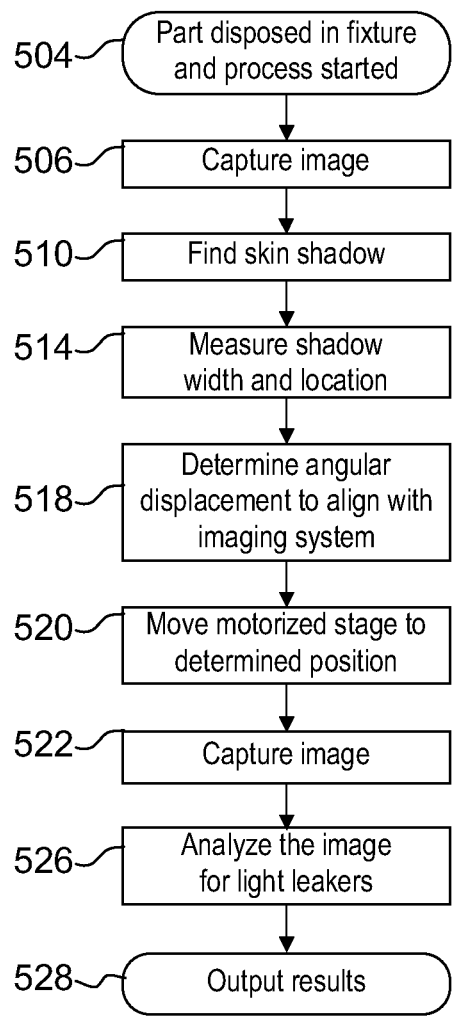
FIG. 10 is a schematic flow chart diagram of an example method to align and analyze a ceramic honeycomb body in an inspection apparatus according to exemplary embodiments of the disclosure.

FIG. 10 is a schematic flow chart diagram of an example method 500 to align a ceramic honeycomb body 106 in an inspection apparatus 100 according to some of the exemplary embodiments of the disclosure. Referring back to FIGS. 1, 2, 3, 4 and 5, the inspection apparatus 100 may perform the exemplary embodiments of the disclosed method 500 to align the ceramic honeycomb body 106 for detection of light leakers 124.

In operation 504 a part 106 is placed in apparatus 100, such as on support chuck 114 and horizontal and vertical reference angle 116 is noted, for example by controller 118. In operation 506 an image of the part 106 looking toward the light source 102 is captured by camera 112 through telecentric lens 110. A portion of the side surface 120 in the image is identified by controller 118 in operation 510. In operation 514, the width and location 122 of the portion of the side surface 120 is measured by the controller 118. In operation 518, the controller 118 determines angular displacement to align the part 106 with the optical axis OP of the apparatus 100 based on the width and location 122 of the portion of the side surface 120. The determination of the angular displacement to achieve alignment can be calculated by the controller 118.

In operation 520, the controller 118 controls the support chuck 114 to move the part 106 by a pitch angle and a yaw angle to the determined angular displacement to align the part 106 with the optical axis OP of the apparatus 100. As used herein, yaw refers to a rotation about an axis perpendicular to the axial direction A of the part 106 on the support chuck 114. As used herein, pitch refers to a rotation about an axis perpendicular to the yaw axis of rotation and perpendicular to the axial direction A of the part 106 on the support chuck 114. The support chuck 114 can be a motorized stage that tilts through yaw and pitch angles as controlled by the controller 118. As a result, more light 104 that enters the part 106 can emerge as light 108 through light leakers 124 at the new yaw and pitch position providing an improved signal to noise ratio and improved resolution for subsequent analyses. In operation 522 an image of the part 106 looking toward the light source 102 is captured by camera 112 through telecentric lens 110 at the new yaw and pitch position, for example, where the part 106 is aligned with the optical axis OP of the apparatus 100. The image captured in operation 522, for example image i (142) as described with reference to FIG. 3, provides a better signal-to-noise ratio for detecting light leakers 124 than when the part 106 is not aligned with the optical axis OP. In operation 526 the image is analyzed for light leakers 124, for example, by the controller 118. In operation 528 the results are output. Output results can include information about detected light leakers 124 such as quantity and position that can be used to remedy the light leakers 124, reject the part 106, and the like.

While the method 500 has been described with reference to using a portion of the side surface 120 in the image to align the part 106, the disclosure is not so limited and the cell aspect ratio method as described above can be used in method 500.

Figure 11:
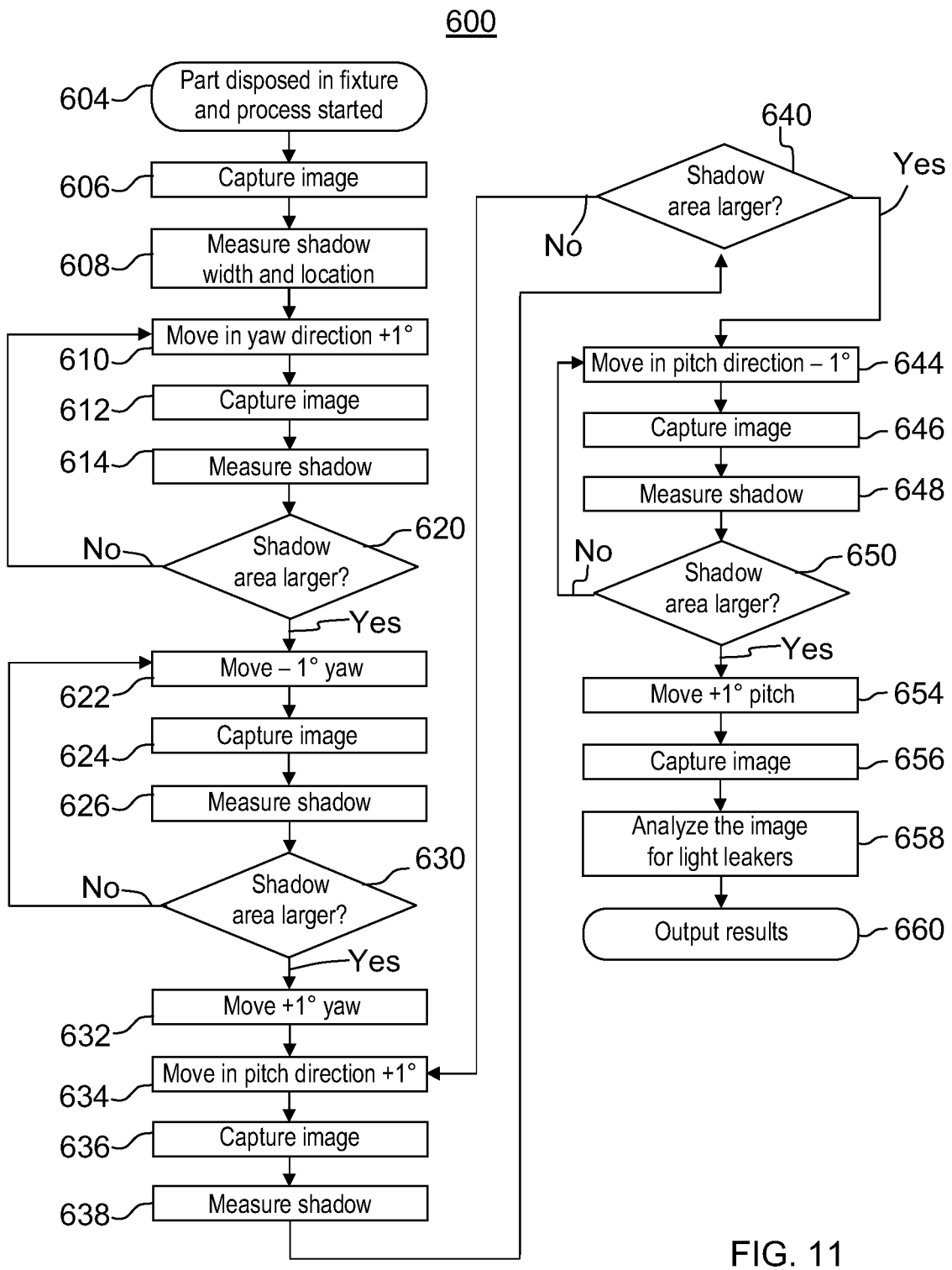
FIG. 11 is a schematic flow chart diagram of an example method to align and analyze a ceramic honeycomb body in an inspection apparatus according to additional exemplary embodiments of the disclosure.

FIG. 11 is a schematic flow chart diagram of an example method 600 to align a ceramic honeycomb body 106 in an inspection apparatus 100 according to additional exemplary embodiments of the disclosure. Referring to FIGS. 1, 2, 3, 4 and 5, the inspection apparatus 100 may perform the exemplary embodiments of the disclosed method 600 to align the ceramic honeycomb body 106 for detection of light leakers 124.

In operation 604 a part 106 is placed in apparatus 100, such as on support chuck 114. In operation 606 an image of the part 106 looking toward the light source 102 is captured by camera 112 through telecentric lens 110. A portion of the side surface 120 in the image is identified, and a parameter, such as width, location and/or area 122 of the portion of the side surface 120 is measured by controller 118 in operation 608.

In operation 610 the part is moved in a positive yaw direction by a step amount, such as by 0.01°, 0.1°, 1°, or the like to minimize the portion of the side surface 120 in the image indicating alignment between the part and the optical axis OP. The controller 118 can control the support 114 to perform the step movement. In operation 612 another image of the part 106 looking toward the light source 102 is captured by the camera 112 through telecentric lens 110. A portion of the side surface 120 in the image is identified, and the parameter 122 of the portion of the side surface 120 is measured by controller 118 in operation 614.

In operation 620 the controller 118 compares the parameter 122 of the portion of the side surface 120 in the image from operation 608 to the parameter 122 from operation 614 and determines whether the area and/or width 122 of the portion of the side surface 120 is larger. If the portion of the side surface 120 is larger, then the method progresses to operation 622, otherwise operations 610 through 620 are repeated with the comparison in operation 620 comparing the area and/or width 122 of the portion of the side surface 120 from two successive measurements in operation 614. When the portion of the side surface 120 is larger in the latest determination of the area and/or width 122 of the portion of the side surface 120, then the method progresses to operation 622 where the part is moved in a negative yaw direction by a step amount, such as by 0.01°, 0.1°, 1°, or the like to minimize the portion of the side surface 120 in the image indicating alignment between the part and the optical axis OP.

In operations 622, 624, 626, and 630 the part is moved in the negative yaw direction by the step amount (622), another image of the part 106 is captured (624), the image is analyzed to determine the area and/or width 122 of the portion of the side surface 120 (626), and the area and/or width 122 is compared with the area and/or width 122 at the preceding yaw position to determine whether the area and/or width 122 is larger than the area and/or width 122 at the preceding yaw position (630), respectively. Operations 622, 624, 626, and 630 are repeated until the area and/or width 122 is larger than the area and/or width 122 at the preceding yaw position. At operation 632 the part can be moved in the positive yaw direction by the step amount so that the area and/or width 122 of the portion of the side surface 120 is minimized in the image.

In operation 634 the part is moved in a positive pitch direction by a step amount, such as by 0.01°, 0.1°, 1°, or the like to minimize the portion of the side surface 120 in the image indicating alignment between the part and the optical axis OP. The pitch step amount can be the same or different than the yaw step amount. The controller 118 can control the support 114 to perform the step movement. In operation 636 another image of the part 106 looking toward the light source 102 is captured by the camera 112 through telecentric lens 110. A portion of the side surface 120 in the image is identified, and the parameter 122 of the portion of the side surface 120 is measured by controller 118 in operation 638.

In operation 640 the controller 118 compares the parameter 122 of the portion of the side surface 120 in the image from operation 626 to the parameter 122 from operation 638 and determines whether the area and/or width 122 of the portion of the side surface 120 is larger. If the portion of the side surface 120 is larger, then the method progresses to operation 644, otherwise operations 634 through 640 are repeated with the comparison in operation 640 comparing the area and/or width 122 of the portion of the side surface 120 from two successive measurements in operation 638. When the portion of the side surface 120 is larger in the latest determination of the area and/or width 122 of the portion of the side surface 120, then the method progresses to operation 644 where the part is moved in a negative pitch direction by a step amount, such as by 0.01°, 0.1°, 1°, or the like to minimize the portion of the side surface 120 in the image indicating alignment between the part and the optical axis OP.

In operations 644, 646, 648, and 650 the part is moved in the negative pitch direction by the step amount (644), another image of the part 106 is captured (646), the image is analyzed to determine the area and/or width 122 of the portion of the side surface 120 (648), and the area and/or width 122 is compared with the area and/or width 122 at the preceding pitch position to determine whether the area and/or width 122 is larger than the area and/or width 122 at the preceding pitch position (650), respectively. Operations 644, 646, 648, and 650 are repeated until the area and/or width 122 is larger than the area and/or width 122 at the preceding pitch position. At operation 654 the part can be moved in the positive pitch direction by the step amount so that the area and/or width 122 of the portion of the side surface 120 is minimized in the image.

At operation 656 the part 106 is aligned with the optical axis OP by operations 604 through 654 to within the step amount and another image of the part 106 is captured. The image captured in operation 656, for example image i (142) as described with reference to FIG. 3, provides a better signal-to-noise ratio for detecting light leakers 124 than when the part 106 is not aligned with the optical axis OP. In operation 658 the image is analyzed for light leakers 124, for example, by the controller 118. In operation 660 the results are output. Output results can include information about detected light leakers 124 such as quantity and position that can be used to remedy the light leakers 124, reject the part 106, and the like.

While the method 600 has been described with reference to using a portion of the side surface 120 in the image to align the part 106, the disclosure is not so limited and the cell aspect ratio method as described above can also be used in method 600.

Figure 12:
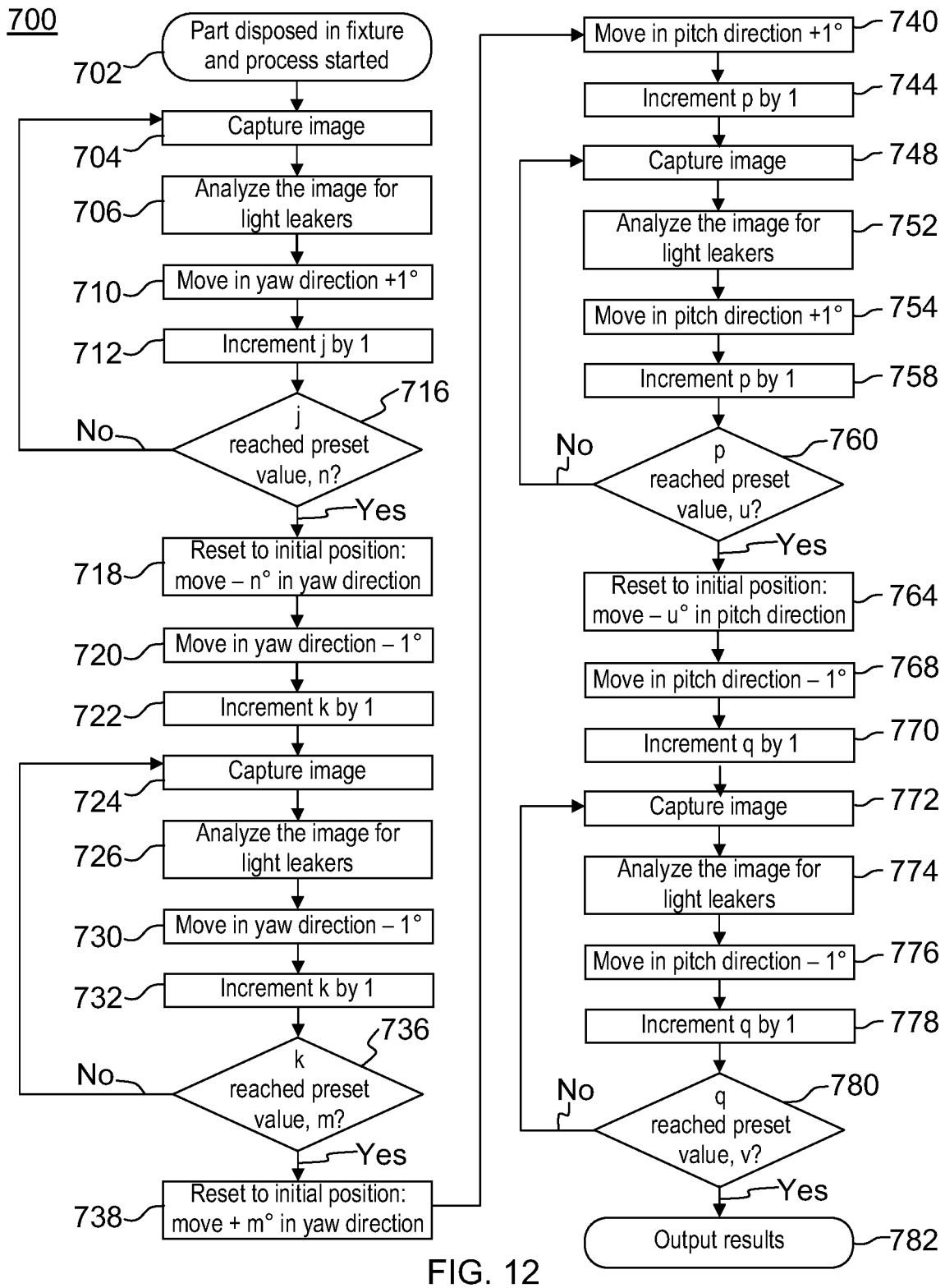
FIG. 12 is a schematic flow chart diagram of another example method to analyze a ceramic honeycomb body in an inspection apparatus according to additional exemplary embodiments of the disclosure.

FIG. 12 is a schematic flow chart diagram of an example method to align and analyze a ceramic honeycomb body in an inspection apparatus according to additional exemplary embodiments of the disclosure. Referring again to FIGS. 1, 2, 3, 4 and 5, the inspection apparatus 100 may perform the exemplary embodiments of the disclosed method 700 to align the ceramic honeycomb body 106 to detect light leakers 124.

In operation 702 a part 106 is placed in apparatus 100, such as on support chuck 114 and initial horizontal and vertical reference angle 116 is noted, for example by controller 118. In operation 704 an image of the part 106 looking toward the light source 102 is captured by camera 112 through telecentric lens 110. In operation 706 the image is analyzed for light leakers 124, for example, by the controller 118. In operation 710 the part is moved in a positive yaw direction by a step amount, such as by 0.01°, 0.1°, 1°, or the like to maximize a signal-to-noise ratio of the light leakers 124 by aligning cell channels of the part 106 to the optical axis OP. A counter j is incremented and a determination whether counter j has reached a preset value n is made in operations 712 and 716. When counter j has not reached the preset value n, operations 704 through 716 are repeated. When counter j reaches the preset value n the part 106 is returned to the initial horizontal and vertical reference angle 116 at operation 718.

In operation 720 the part is moved in a negative yaw direction by a step amount, such as by 0.01°, 0.1°, 1°, or the like to maximize a signal-to-noise ratio of the light leakers 124 by aligning cell channels of the part 106 to the optical axis OP. A counter k is incremented by 1 in operation 722 and in operation 724 another image of the part 106 looking toward the light source 102 is captured by camera 112 through telecentric lens 110. In operation 726 the image is analyzed for light leakers 124, for example, by the controller 118.

In operation 730 the part is moved in the negative yaw direction by the step amount. The counter k is incremented and a determination whether counter k has reached a preset value m is made in operations 732 and 736. When counter k has not reached the preset value m, operations 724 through 736 are repeated. When counter k reaches the preset value m the part 106 is returned to the initial horizontal and vertical reference angle 116 at operation 738.

In operation 740 the part is moved in a positive pitch direction by a step amount, such as by 0.01°, 0.1°, 1°, or the like to maximize a signal-to-noise ratio of the light leakers 124 by aligning cell channels of the part 106 to the optical axis OP. A counter p is incremented by 1 in operation 744 and in operation 748 another image of the part 106 looking toward the light source 102 is captured by camera 112 through telecentric lens 110. In operation 752 the image is analyzed for light leakers 124, for example, by the controller 118.

In operation 754 the part is moved in the positive pitch direction by the step amount. The counter p is incremented and a determination whether counter p has reached a preset value u is made in operations 758 and 760. When counter p has not reached the preset value u, operations 748 through 760 are repeated. When counter p reaches the preset value u the part 106 is returned to the initial horizontal and vertical reference angle 116 at operation 764.

In operation 768 the part is moved in a negative pitch direction by the step amount to maximize a signal-to-noise ratio of the light leakers 124 by aligning cell channels of the part 106 to the optical axis OP. A counter q is incremented by 1 in operation 770 and in operation 772 another image of the part 106 looking toward the light source 102 is captured by camera 112 through telecentric lens 110. In operation 774 the image is analyzed for light leakers 124, for example, by the controller 118.

In operation 776 the part is moved in the negative pitch direction by the step amount. The counter q is incremented and a determination whether counter q has reached a preset value v is made in operations 778 and 780. When counter q has not reached the preset value v, operations 772 through 780 are repeated. When counter q reaches the preset value v the result is output at operation 782.

According to the operations of the method 700 a total of n+m+u+v images can be part of the output results. Any cell channel that transmitted light in any of the images can be identified as a light leaker 124 as output results. That is, across the part 106, some cell channel orientations may vary from other cell channel orientations depending on factors such as part manufacturing procedures. Accordingly, cell channels that align with the optical axis OP at different angles 116 between the part 106 and the optical axis OP can generate a stronger signal-to-noise ratio in some of the images and other cell channels that align with the optical axis OP at different angles 116 between the part 106 and the optical axis OP can generate a stronger signal-to-noise ratio in other of the images. Thus, the output results can include information about detected light leakers 124 such as quantity and position that can be used to remedy the light leakers 124, reject the part 106, and the like.

The pitch and yaw angles 116 are not required to be with respect to a side view and a top view, respectively, that is, the pitch and yaw angles 116 can be at any orientation. Generally, the pitch angle and yaw angle 116 are orthogonal to one another. While terms, top, side, vertical, and horizontal are used, the disclosure is not so limited to these exemplary embodiments. Instead, spatially relative terms, such as "top", "bottom", "horizontal", "vertical", "side", "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly. Thus, the exemplary term "side view" can become a "top view" and vice versa when the inspection apparatus in FIG. 1 is rotated 90 degrees.

It will be understood that for the purposes of this disclosure, "at least one of X, Y, or Z" can be construed as X only, Y only, Z only, or any combination of two or more items X, Y, and Z (e.g., XYZ, XYY, YZ, ZZ).

Reference throughout this specification to exemplary embodiments and similar language throughout this specification may, but do not necessarily, refer to the same embodiment. Furthermore, the described features, structures, or characteristics of the subject matter described herein with reference to an exemplary embodiment may be combined in any suitable manner in one or more exemplary embodiments.

It will be apparent to those skilled in the art that various modifications and variations can be made in the present disclosure without departing from the spirit or scope of the disclosure. Thus, it is intended that the appended claims cover the modifications and variations of this disclosure provided they come within the scope of the appended claims and their equivalents.

The invention claimed is:

1. A method comprising:
   directing a light from a light source toward a first end of a ceramic honeycomb body, wherein the ceramic honeycomb body comprises cell channels extending axially from the first end to a second end opposite the first end, and an outer periphery extending from the first end to the second end, and
   wherein a portion of the light is blocked-by a portion of the ceramic honeycomb body;
   imaging through a lens, the second end of the ceramic honeycomb body as a first portion of blocked light and a portion of the outer periphery of the ceramic honeycomb body as a second portion of blocked light;
   capturing an image of the ceramic honeycomb body, wherein the image includes the first portion of blocked light and the second portion of blocked light;
   determining an angular displacement of the ceramic honeycomb body by analyzing at least a portion of the image, wherein the portion of the image analyzed includes the second portion of blocked light; and
   adjusting at least one of the ceramic honeycomb body or the lens based on the determined angular displacement to align the ceramic honeycomb body and an optical axis of the lens to each other.

2. The method of claim 1, wherein analyzing at least the portion of the image comprises detecting the second portion of blocked light in the image.

3. The method of claim 2, wherein analyzing at least the portion of the image further comprises calculating an area of the second portion of blocked light.

4. The method of claim 2, wherein the analyzing at least the portion of the image further comprises determining a location of the second portion of blocked light in relation to the first portion of blocked light.

5. The method of claim 1, wherein adjusting at least one of the ceramic honeycomb body or the lens based on the determined angular displacement aligns the cell channels to the optical axis of the lens.

6. The method of claim 1, wherein a first portion of the cell channels comprises plugs at the first end of the ceramic honeycomb body and a second portion of the cell channels comprises plugs at the second end of the ceramic honeycomb body.

7. The method of claim 6, further comprising:
detecting the light directed through a portion of at least one of the first portion of the cell channels or the second portion of the cell channels.

8. The method of claim 7, further comprising:
identifying the detected light as being transmitted through defective plugs.

9. The method of claim 8, further comprising:
when the defective plug is identified recording at least one of an identifier of the ceramic honeycomb body or a location of the defective plug.

10. An apparatus comprising:
a light source configured to direct light toward a first end of a ceramic honeycomb body, wherein the ceramic honeycomb body comprises cell channels extending axially from the first end to a second end opposite the first end, and an outer periphery extending from the first end to the second end;
a lens configured to receive at least a portion of the light directed from the light source toward the first end of the ceramic honeycomb body;
an imaging device configured to capture an image of the ceramic honeycomb body, wherein the image comprises a portion of the outer periphery of the ceramic honeycomb body;
a support chuck configured to support the ceramic honeycomb body; and
a controller configured to receive the captured image, to analyze the captured image based on the portion of the outer periphery of the ceramic honeycomb body, to determining an angular displacement of the ceramic honeycomb body by analyzing at least a portion of the image and to adjust at least one of the support chuck or the lens based on the determined angular displacement of the ceramic honeycomb body, and to align the ceramic honeycomb body and an optical axis of the lens.

11. The apparatus of claim 10, wherein the light source comprises at least one of a diffuse light source or a collimated light source.

12. The apparatus of claim 10, wherein the controller is configured to identify the portion of the outer periphery of the ceramic honeycomb body in the image.

13. The apparatus of claim 10, wherein the controller is configured to calculate an area of the portion of the outer periphery of the ceramic honeycomb body based on the image.

14. The apparatus of claim 10, wherein the controller is configured to calculate a location of the portion of the outer periphery of the ceramic honeycomb body based on the image.

15. The apparatus of claim 10, wherein the controller is configured to align the cell channels to the optical axis of the lens.

16. The apparatus of claim 15, wherein a first portion of the cell channels comprises plugs at the first end of the ceramic honeycomb body and a second portion of the cell channels comprises plugs at the second end of the ceramic honeycomb body, and
the controller is configured to detect identify, based on the captured image, the light from the light source that was transmitted through a portion of at least one of the first portion of the cell channels or the second portion of the cell channels as being transmitted through defective plugs.

17. The apparatus of claim 16, wherein the controller is configured to record at least one of an identifier of the ceramic honeycomb body or a location of the defective plug when the defective plug is identified.

18. The apparatus of claim 10, wherein the imaging device comprises a camera having a detector to capture the image of the ceramic honeycomb body.

19. The apparatus of claim 10, further comprising:
a transport device configured to place the ceramic honeycomb body on the support chuck, wherein the cell channels and the lens optical axis are out of alignment with respect to at least one of a yaw angle or a pitch angle.

* * * * *

UNITED STATES PATENT AND TRADEMARK OFFICE
CERTIFICATE OF CORRECTION

PATENT NO. : 11,287,389 B2
APPLICATION NO. : 16/321684
DATED : March 29, 2022
INVENTOR(S) : Russell Wayne Madara et al.

It is certified that error appears in the above-identified patent and that said Letters Patent is hereby corrected as shown below:

In the Claims

In Column 14, Line 35, in Claim 1, delete "blocked-by" and insert -- blocked by --.

In Column 14, Line 37, in Claim 1, delete "imaging" and insert -- imaging, --.

In Column 14, Line 58, in Claim 4, after "wherein" delete "the".

In Column 16, Line 22, in Claim 16, after "configured to" delete "detect".

Signed and Sealed this
First Day of August, 2023

Katherine Kelly Vidal
*Director of the United States Patent and Trademark Office*